(12) United States Patent
Limbacher et al.

(10) Patent No.: US 11,851,057 B2
(45) Date of Patent: Dec. 26, 2023

(54) METHOD AND SYSTEM FOR OPERATING A LANE-KEEPING ASSISTANCE DEVICE OF A MOTOR VEHICLE

(71) Applicant: AUDI AG, Ingolstadt (DE)

(72) Inventors: Reimund Limbacher, Ingolstadt (DE); Artur Burczyk, Berlin (DE)

(73) Assignee: AUDI AG, Ingolstadt (DE)

( * ) Notice: Subject to any disclaimer, the term of this patent is extended or adjusted under 35 U.S.C. 154(b) by 673 days.

(21) Appl. No.: 16/975,487

(22) PCT Filed: Feb. 1, 2019

(86) PCT No.: PCT/EP2019/052468
§ 371 (c)(1),
(2) Date: Dec. 18, 2020

(87) PCT Pub. No.: WO2019/170329
PCT Pub. Date: Sep. 12, 2019

(65) Prior Publication Data
US 2021/0107479 A1    Apr. 15, 2021

(30) Foreign Application Priority Data
Mar. 6, 2018   (DE) .................. 10 2018 203 287.4

(51) Int. Cl.
*B60W 30/12* (2020.01)
*B60W 10/20* (2006.01)
(Continued)

(52) U.S. Cl.
CPC ........... *B60W 30/12* (2013.01); *B60W 10/20* (2013.01); *B60W 40/072* (2013.01);
(Continued)

(58) Field of Classification Search
USPC ......................................................... 701/41
See application file for complete search history.

(56) References Cited

U.S. PATENT DOCUMENTS 9,014,915 B2 *  4/2015  Chatterjee ............. B60W 30/00
                                                340/576
9,308,914 B1 *  4/2016  Sun ...................... B60W 30/143
(Continued)

FOREIGN PATENT DOCUMENTS

DE    102004047889 A1    4/2006
DE    602004010685 T2   12/2008
(Continued)

OTHER PUBLICATIONS

International Search Report and Written Opinion of the International Searching Authority directed to related International Patent Application No. PCT/EP2019/052468, dated Jun. 6, 2019, with attached English-language translation; 17 pages.
(Continued)

*Primary Examiner* — Jonathan M Dager
(74) *Attorney, Agent, or Firm* — Sterne, Kessler, Goldstein & Fox P.L.L.C.

(57) ABSTRACT

This disclosure relates to a method for operating a lane-keeping assistance device of a motor vehicle including activating a lane-keeping assistance device, and checking whether at least one predefinable enabling criterion for enabling an actuation of the lane-keeping assistance device for triggering a steering intervention is fulfilled in response to a trigger signal for actuating the lane-keeping assistance device for triggering a steering intervention being established. The method includes enabling an actuation of the lane-keeping assistance device for triggering a steering intervention in response to at least one predefinable enabling criterion for enabling an actuation of the lane-keeping assistance device being fulfilled.

16 Claims, 2 Drawing Sheets

(51) Int. Cl.
  *B60W 40/072* (2012.01)
  *B60W 40/08* (2012.01)
  *B60W 50/16* (2020.01)
  *G01C 21/34* (2006.01)

(52) U.S. Cl.
  CPC ............ *B60W 40/08* (2013.01); *B60W 50/16* (2013.01); *G01C 21/3461* (2013.01); *B60W 2040/0818* (2013.01); *B60W 2040/0872* (2013.01); *B60W 2420/40* (2013.01); *B60W 2420/42* (2013.01); *B60W 2520/125* (2013.01); *B60W 2540/18* (2013.01); *B60W 2540/20* (2013.01); *B60W 2540/221* (2020.02); *B60W 2540/26* (2013.01); *B60W 2555/20* (2020.02)

(56) References Cited

U.S. PATENT DOCUMENTS

| | | | |
|---|---|---|---|
| 9,315,194 B2* | 4/2016 | Okuda | B60W 40/08 |
| 9,434,383 B2* | 9/2016 | Kim | B60W 10/20 |
| 10,049,551 B2* | 8/2018 | Lindberg | B60K 28/066 |
| 10,394,236 B2* | 8/2019 | Wiklinska | G06V 20/59 |
| 10,562,450 B2* | 2/2020 | Prakah-Asante | B60Q 9/00 |
| 2007/0024430 A1* | 2/2007 | Ling | B60Q 9/008 |
| | | | 340/436 |
| 2010/0222976 A1* | 9/2010 | Haug | B60W 40/09 |
| | | | 340/439 |
| 2011/0245992 A1* | 10/2011 | Stahlin | B60W 50/085 |
| | | | 701/1 |
| 2012/0212353 A1* | 8/2012 | Fung | G08G 1/167 |
| | | | 701/1 |
| 2013/0063595 A1 | 3/2013 | Niem | |
| 2013/0096767 A1 | 4/2013 | Rentschler et al. | |
| 2015/0197283 A1* | 7/2015 | Marti | G01C 21/3652 |
| | | | 701/41 |
| 2017/0120925 A1* | 5/2017 | Stefan | G01C 21/3697 |
| 2017/0248957 A1* | 8/2017 | Delp | B60W 10/20 |
| 2017/0261974 A1* | 9/2017 | Ebe | B60W 30/14 |
| 2017/0305349 A1* | 10/2017 | Naboulsi | B60R 1/025 |
| 2017/0364629 A1* | 12/2017 | Tarte | G16Z 99/00 |
| 2017/0372431 A1* | 12/2017 | Perl | G06Q 40/08 |
| 2018/0173230 A1* | 6/2018 | Goldman-Shenhar | |
| | | | B60W 50/14 |
| 2018/0174449 A1* | 6/2018 | Nguyen | G08G 1/015 |
| 2018/0365533 A1* | 12/2018 | Sathyanarayana | G08G 1/0145 |
| 2021/0188289 A1* | 6/2021 | Oba | G08G 1/00 |
| 2023/0065399 A1* | 3/2023 | Ren | G06V 20/597 |
| 2023/0106673 A1* | 4/2023 | Asghar | G08G 1/0112 |
| | | | 382/104 |

FOREIGN PATENT DOCUMENTS

| | | |
|---|---|---|
| DE | 102010029222 A1 | 11/2011 |
| DE | 102011121440 A1 | 6/2013 |
| DE | 102014007341 A1 | 11/2014 |
| DE | 202014006923 U1 | 11/2015 |
| DE | 102015220237 A1 | 4/2017 |
| DE | 102015221651 A1 | 5/2017 |
| EP | 2253499 A1 | 11/2010 |
| EP | 2489566 A2 | 8/2012 |
| EP | 2620314 A1 | 7/2013 |
| WO | WO 2014/083649 A1 | 6/2014 |

OTHER PUBLICATIONS

International Preliminary Report on Patentability directed to related International Patent Application No. PCT/EP2019/052468, dated Sep. 8, 2020, with attached English-language translation; 14 pages.

* cited by examiner

METHOD AND SYSTEM FOR OPERATING A LANE-KEEPING ASSISTANCE DEVICE OF A MOTOR VEHICLE

TECHNICAL FIELD

The present disclosure relates to a method for operating a lane-keeping assistance device of a motor vehicle comprising the step of activating a lane-keeping assistance device. It further relates to a system for operating a lane-keeping assistance device of a motor vehicle comprising a lane-keeping assistance device and a control device coupled to the lane-keeping assistance device.

In the scope of the present disclosure, a lane-keeping assistance device is understood to be a driver assistance system designed to perform a steering intervention shortly before a vehicle passes over a lane marking line. This does not refer to a driver assistance device designed to keep a vehicle in the center of a roadway, as is desired, for example, in the case of autonomously driving vehicles.

BACKGROUND

Current lane-keeping assistance systems support a driver with active steering interventions to keep the vehicle in lane. A steering intervention causes a crossing of the lane line marking to be prevented. In the functional manifestation having very late steering interventions, i.e., shortly before the vehicle crosses a lane marking line with one wheel, the system has the character of a warning function with support. The aim of this functional manifestation is to prevent accidents by drifting off the roadway, particularly if the leaving of the lane is unintentional. Today, the functional philosophy of these functions is defined in such a manner that an active steering intervention is automatically set for all driving maneuvers in which a recognized lane marking line is approached, which firstly warns the driver (wakes him up!) and simultaneously steers the vehicle back towards the center of the lane.

In order to enable the driver to cross the line intentionally without disturbing steering intervention, certain blocking criteria (warning suppression) are usually defined. These are for example:

Driver has put turn indicators on the side where he drives over the lane marking, i.e., warning suppression when intentionally changing lanes;

In tighter curves, the driver consciously steers towards the inside of the curve, i.e., warning suppression for enabling "curve cutting";

Driver drives up to a slower front vehicle and starts passing without using the turn indicator, i.e., warning suppression for passing without a turn indicator, and more.

This intervention philosophy of actively intervening in almost all driving maneuvers involving approaching a lane marking line has the advantage that the warning interventions are carried out in a reliable and reproducible manner. However, numerous exceptional situations, i.e., blocking criteria, are already provided for, because otherwise too many undesirable and disturbing steering interventions would occur. Experience shows that this philosophy leads to very frequent interventions, mostly because the driver is not driving precisely enough in the center of the lane, e.g., when driving dynamically, on curved roads, when intentionally driving offset behind a front vehicle, etc.

This increased incidence of active steering interventions often soon dulls and even annoys the driver in such a manner that he switches off the system or at least no longer perceives the interventions as a warning.

An obvious solution approach would be to incorporate a plurality of further warning suppression criteria to reduce the number of unwanted interventions. However, this would have the disadvantage of significantly impairing the reliability of the system, especially in situations where unintentional leaving of the lane occurs.

In this context, a device and method for monitoring the operation of a vehicle and warning a driver is known from EP 2 620 314 A1. The vehicle comprises a driver assistance system for warning the driver of leaving a driving lane, wherein an intervention of the driver assistance system is adapted to a forthcoming driving situation and to a detected attention of the driver. The main idea is to define indicators such as fatigue, criticality, attention and driving situations and to selectively adjust the way the driver assistance system warns depending on these indicator values. The adaptation occurs when the driver assistance system intervenes or warns "earlier," "more frequently," "more comprehensively" or "with increased perceptibility."

A method for operating a vehicle is known from DE 10 2014 007 341 A1, wherein the vehicle comprises a lane-keeping assistant which is only activated, i.e., turned on, when lack of attention or fatigue of the driver is detected.

From DE 10 2015 220 237 A1 a vehicle system and method for activating a self-driving unit for autonomous driving of a vehicle is known. The vehicle system comprises a lane-keeping assistant which is activated when, by means of an artificial intelligence, a lack of attention of a driver of the vehicle is detected over a longer period of time.

BRIEF DESCRIPTION OF THE DRAWINGS/FIGURES

DETAILED DESCRIPTION

Figure 1:
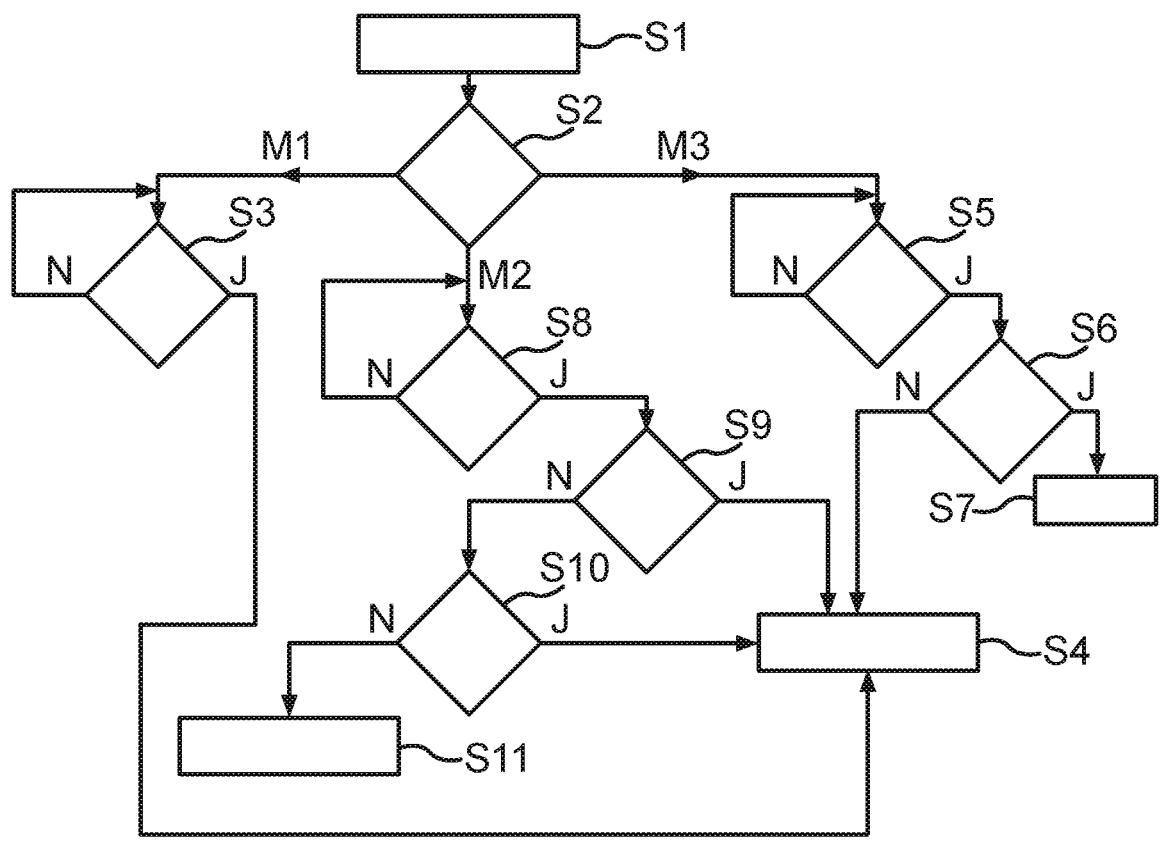
FIG. 1 is a schematic representation of a signal flow-graph of a method for operating a lane-keeping assistance device of a motor vehicle, in accordance with some embodiments.

The object of the present disclosure is to further develop a generic method or generic system in such a manner that traffic safety can be further improved.

The present disclosure is based on the recognition that traffic safety can be improved if the drivers of motor vehicles equipped with a lane-keeping assistance device do not deactivate it because they are dulled or annoyed by the frequent occurrence of undesirable active steering interventions. For this purpose, the present disclosure chooses a way in which the well-known intervention philosophy is exactly reversed. Active steering intervention is not performed every time a lane marking is approached, but only in driving situations where there are clear indications of a high benefit potential regarding unintentional leaving of the lane or a low disruption potential. While in the aforementioned EP 2 620 314 A1 the intervention parameters are made "sharper" if indicator values such as fatigue, criticality, attention and driving situation make this appear beneficial, i.e., the driver assistance system then intervenes earlier, more frequently, more comprehensively or with increased perceptibility, in the present invention, after a corresponding trigger signal for a steering intervention has been established, no intervention is initially made, but only if a check has shown that at least one predefinable enabling criterion is fulfilled.

In some embodiments, no steering intervention occurs if at least one predefinable enabling criterion is not fulfilled. In the case of the aforementioned EP 2 620 314 A1, however, interventions occur in principle even more frequently, stronger, etc., if the indicator values deem this to be reasonable. The measure mentioned in EP 2 620 314 A1 will therefore continue to dull or annoy drivers, which would lead to steering interventions being ignored or even to the lane-keeping assistance device being deactivated and thus to worsening traffic safety. In the worst case, the lane-keeping assistance device is deactivated for a very long time—depending on the operating or activation concept—even for a plurality of ignition changes, for example, i.e., possibly up to a plurality of days, weeks or even months.

In some embodiments, when a trigger signal for actuating the lane-keeping assistance device for triggering a steering intervention is detected, it is checked whether at least one predefinable enabling criterion for enabling an actuation of the lane-keeping assistance device for triggering a steering intervention is fulfilled. Only when it is established that at least one predefinable enabling criterion for enabling an actuation of the lane-keeping assistance device is fulfilled, an actuation of the lane-keeping assistance device for triggering a steering intervention is subsequently enabled.

While in the aforementioned EP 2 620 314 A1, the aforementioned criteria result in a trigger signal being generated more frequently, in some embodiments, the criteria for generating a trigger signal are not affected, whereas after determining a trigger signal it is checked whether at least one predefinable enabling criterion is fulfilled, in such a manner that a benefit prevails over a potential disturbance and therefore a steering intervention is enabled. This leads to a significant reduction in undesirable, disruptive or annoying steering interventions, in such a manner that the danger of a driver deactivating the lane-keeping assistance device is significantly reduced compared to the prior art.

In some embodiments, a first step explicitly comprises embodiments in which the lane-keeping assistance device is always activated automatically when the vehicle is started.

In some embodiments, a driving situation criterion from the following group is preferably checked as the at least one predefinable enabling criterion:

A driver of the motor vehicle drives on a route whose average road curvature is below a predefinable threshold value over a predefinable route length and/or a predefinable period of time;

A driver of the motor vehicle is already driving a route having a length above a predefinable threshold value;

A driver of the motor vehicle is already driving for a period of time above a predefinable threshold value;

A driver of the motor vehicle travels on a route whose peripheral development lies above a predefinable monotony threshold value;

A driver of the motor vehicle still has a route to complete, whose length is above a predefinable threshold value;

A driver of the motor vehicle drives under a predefinable threshold in ambient visibility conditions and/or ambient brightness, particularly in darkness and/or at a late hour and/or fog and/or precipitation.

These are driving situations that require increased attention of the driver and/or where above-average fatigue of the driver can be expected. These driving situations are therefore to be considered as a clear indicator that the leaving of the lane is unintentional and that the driver therefore benefits from a steering intervention. Therefore, it is enabled in the presence of at least one such enabling criterion.

In some embodiments, at least one of the following devices is preferably used to determine the presence of such driving situation criteria: Navigation system, transverse acceleration sensor, steering angle sensor, front camera, clock, light sensor, precipitation sensor.

By way of a non-limiting example, to check a driver's condition criterion from the following group as the at least one predefinable enabling criterion:

A driver of the motor vehicle averts his gaze from the route to be driven for a period of time that is above a predefinable threshold;

A driver of the motor vehicle has his eyes closed for a period of time that is above a predefinable threshold value;

A driver of the motor vehicle performs a secondary activity for a period of time that is above a predefinable threshold value;

A driver of the motor vehicle meets at least one predefinable fatigue criterion;

A driver of the motor vehicle does not meet at least one predefinable health criterion.

From the aforementioned driver conditions, it can be concluded that the potential benefits of a steering intervention outweigh the disruption potential. If at least one such predefinable enabling criterion is present, a steering intervention is therefore enabled.

In some embodiments, at least one of the following devices is preferably be used to determine the presence of a driver's condition criterion: Driver observation camera; human-machine interface of the motor vehicle; mobile terminal coupled to the motor vehicle; interior microphone; vehicle steering; driver's pulse measuring device; driver's body temperature measuring device. Because a plurality of these mentioned devices are implemented in motor vehicles nowadays, the implementation of the method as described herein can therefore be carried out with little effort and at low cost.

In some embodiments, by means of the driver observation camera, for example, the driver's viewing direction can be established, as well as eyelid closure. Whether a driver is distracted can be established by whether he is performing secondary activities, such as operating a human-machine interface or a mobile terminal. A telephone call can be established, for example, from telephone signals recorded by an interior microphone or by recording conversations with passengers.

The corresponding method forms an algorithm for the combination of the enabling criteria either rule-based or as neural network or fuzzy logic.

In some embodiments, the method may include the following steps: If it is established that no predefinable enabling criterion is fulfilled, whether a plurality of enabling criteria are fulfilled at least to a predefinable percentage may be checked, and if it is established that a plurality of enabling criteria are fulfilled at least to a predefinable percentage an actuation of the lane-keeping assistance device for triggering a steering intervention may be enabled. "A plurality of" enabling criteria in the present case means for example two, three, four or five enabling criteria. By way of a non-limiting example, appropriate percentages are deviations of 20, 10 or 5 percent from the envisaged threshold. For example, if it is not yet completely dark, but the driver has been driving for a considerable time, wherein the values for brightness and driving time have not yet reached the intended threshold values, it can still be concluded from the combination of these two criteria that an upcoming crossing of a lane line marking could be unintentional, in such a manner that a driver would benefit from steering intervention. This embodiment can further increase the sensitivity of the method according to the invention.

In some embodiments, if it is established that a plurality of enabling criteria are not met at least to a predefinable percentage, a warning signal may be issued, for example, a visual warning instruction and/or a haptic instruction, at or within a predefinable period of time before a lane marking line is crossed. In this manner, the driver is not disturbed by any steering intervention, but the instruction can draw the driver's attention to his reduced attention or increased fatigue, in such a manner that the driver realizes that a driving break would be appropriate. Thus, this measure will also further increase traffic safety.

In some embodiments, the lane-keeping assistance device may be initialized before performing any other action by selecting one of three operating modes: In the first operating mode, whenever a trigger signal is established to actuate the lane-keeping assistance device to trigger a steering intervention, the lane-keeping assistance device is actuated to trigger the steering intervention ("always" operating mode). This operating mode is comparable to the procedure presented in the aforementioned EP 2 620 314 A1. In the second operating mode, known as "adaptive" operating mode, the lane-keeping assistance device may be initialized, fulfillment of the plurality of enabling criteria to the predefinable percentage may be checked, lane-keeping assistance device may be actuated. In the third operating mode, whenever a trigger signal is established to actuate the lane-keeping assistance device to trigger a steering intervention, it is checked whether at least one blocking criterion for blocking an actuation of the lane-keeping assistance device is fulfilled. If it is established that at least one predefinable blocking criterion for blocking an actuation of the lane-keeping assistance device is fulfilled, the actuation of the lane-keeping assistance device is blocked in order to prevent the triggering of a steering intervention in what may be known as "medium" operating mode.

As already mentioned, the at least one predefinable blocking criterion can particularly be a criterion from the following group:

A driver has set a turn indicator on the side where he will cross the marking line;

A driver cuts curves, i.e. he deliberately steers towards the inside of the curve when the curves are tight;

A driver drives up to a slower driving front vehicle and starts passing, but without using the turn indicator.

In some embodiments, the provision of various operating modes ensures that a driver selects an operating mode that is acceptable to him, in such a manner that a high acceptance of a lane-keeping assistance device can be achieved even among the most different drivers. Each driver can therefore select the operating mode in which he does not find an activated lane-keeping assistance device disturbing or annoying, in such a manner that the risk of the driver deactivating the lane-keeping assistance device is significantly reduced. This particularly contributes to an increase in traffic safety.

Further advantageous embodiments result from the subclaims.

The various embodiments presented in conjunction with the method as described herein and their advantages apply correspondingly, if applicable, to a system for operating a lane-keeping assistance device of a motor vehicle. In some embodiments, the system comprises a lane-keeping assistance device and a control device which is coupled to the lane-keeping assistance device. The control device is designed to check, upon occurrence of a trigger signal for actuating the lane-keeping assistance device for triggering a steering intervention, whether at least one predefinable enabling criterion for enabling an actuation of the lane-keeping assistance device for triggering a steering intervention is fulfilled. The control device is further designed, when it is established that at least one predefinable enabling criterion for enabling an actuation of the lane-keeping assistance device is fulfilled, to enable an actuation of the lane-keeping assistance device for triggering a steering intervention.

In the following, an embodiment of the present disclosure is described in detail with reference to the attached drawings. In which:

FIG. 1 shows a schematic representation of a signal flow-graph for an embodiment of a method according to the present disclosure for operating a lane-keeping assistance device of a motor vehicle. Thereby the lane-keeping assistance device is activated in step S1. This can occur automatically when the motor vehicle is started, but can also occur manually by a corresponding user input after the motor vehicle has been started. In step S2 the lane-keeping assistance device is initialized. The user can select one of three operating modes of the lane-keeping assistance device. In the operating mode M1, whenever a trigger signal is established to actuate the lane-keeping assistance device to trigger a steering intervention, the lane-keeping assistance device is actuated to trigger the steering intervention. For this purpose, in step S3 it is continuously checked whether a trigger signal can be established. If the answer is no, step S3 is repeated. However, if a trigger signal is detected, the method proceeds to step S4, in which the lane-keeping assistance device is actuated to trigger the steering intervention. The method subsequently branches back to step S3. However, for the sake of clarity this is not shown.

If the third operating mode M3 is selected in step S2, whenever a trigger signal for triggering a steering intervention is established, it is checked whether at least one blocking criterion for blocking an actuation of the lane-keeping assistance device is fulfilled. Therefore, in step S5 it is again continuously checked whether a trigger signal can be established. If the answer is affirmative, the method branches on to step S6, in which it is checked whether at least one blocking criterion for blocking an actuation of the lane-keeping assistance device is fulfilled. Predefinable blocking criteria can be when an intentional leaving of the driving lane is established, when an intentional curve cutting is established, when a passing without turn indicators is established.

If there is no such blocking criterion, an actuation of the lane-keeping assistance device to trigger a steering intervention is enabled, see step S4. However, if it is established in step S6 that a predefinable blocking criterion is fulfilled, the method is continued in step S7, whereafter no steering intervention is executed. The method is further continued in step S5, but for the sake of clarity this is not shown.

If the driver selects the second operating mode M2 in step S2, it is checked in step S8 whether a trigger signal can be established for actuating the lane-keeping assistance device to trigger a steering intervention. This step is repeated continuously until such a trigger signal is established. The method then branches further to step S9, in which it is checked whether at least one predefinable enabling criterion for enabling an actuation of the lane-keeping assistance device for triggering a steering intervention is fulfilled. If the answer is affirmative, an actuation of the lane-keeping assistance device for triggering a steering intervention is enabled, i.e. the method branches to step S4. However, if the check in step S9 is negative, it is checked in step S10 whether a predefinable number of enabling criteria are fulfilled at least to a predefinable percentage. For example, it may be provided that at least two enabling criteria must be fulfilled having a deviation of less than 10% from a predefinable threshold value. If so, an actuation of the lane-keeping assistance device for triggering a steering intervention is enabled. However, if the check in step S10 is negative, the method is continued in step S11. A warning signal, particularly a visual warning instruction and/or a haptic instruction, is output at a predefinable period of time before a lane marking line is crossed.

The method is subsequently continued in step S8, wherein this is not drawn for the sake of clarity.

Figure 2:
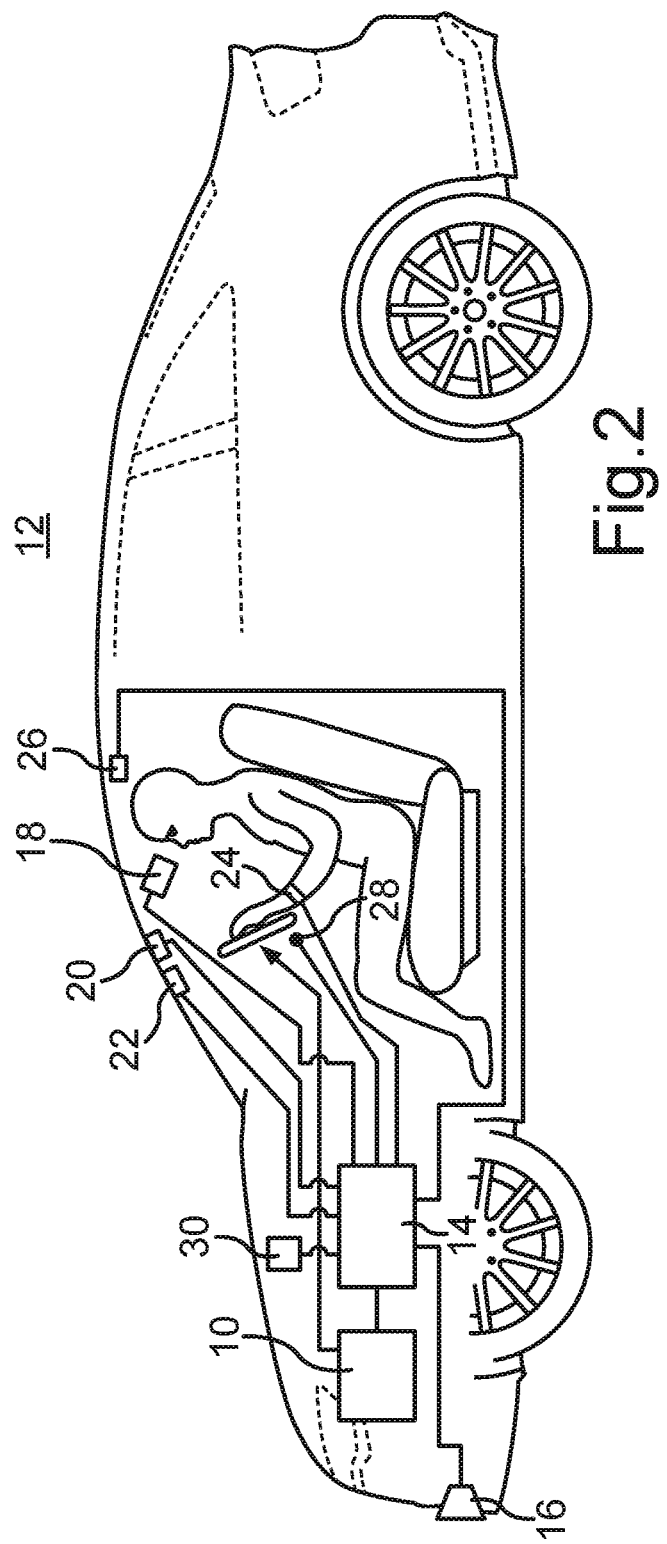
FIG. 2 is a schematic representation of a system for operating the lane-keeping assistance device of the motor vehicle, in accordance with some embodiments.

FIG. 2 shows a schematic representation of a system according to the present disclosure for operating a lane-keeping assistance device 10 of a motor vehicle 12. This system comprises the aforementioned lane-keeping assistance device 10 and a control device 14 coupled to the lane-keeping assistance device 10. The control device 14 is further coupled to at least one front camera 16, a driver observation camera 18, a light sensor 20, a precipitation sensor 22, a driver's pulse and driver's body temperature measuring device 24, at least one interior microphone 26, a steering angle sensor 28 and a clock 30. The control device 14 may be coupled to other devices for detecting a driving situation and/or a driver's condition.

The control device 14 is designed to generate a trigger signal for actuating the lane-keeping assistance device for triggering a steering intervention if it is established by means of at least one front camera 16 that the motor vehicle is about to cross a lane marking line. When such a trigger signal is generated, the control device 14 checks whether a steering operation is to be performed or omitted by evaluating the different signals supplied thereto by the devices 16 to 30. In this context, the control device 14 checks whether at least one predefinable enabling criterion for enabling an actuation of the lane-keeping assistance device 10 for triggering a steering intervention is fulfilled. By means of the signals supplied thereto, it is checked, for example, whether a driving situation criterion from the following group is fulfilled:

A driver of the motor vehicle drives on a route whose average road curvature is below a predefinable threshold value over a predefinable route length and/or a predefinable period of time;

A driver of the motor vehicle is already driving a route having a length above a predefinable threshold value;

A driver of the motor vehicle is already driving for a period of time above a predefinable threshold value;

A driver of the motor vehicle travels on a route whose peripheral development lies above a predefinable monotony threshold;

A driver of the motor vehicle still has a route to complete, whose length is above a predefinable threshold value;

A driver of the motor vehicle drives under a predefinable threshold in ambient visibility conditions and/or ambient brightness, particularly in darkness and/or at a late hour and/or fog and/or precipitation.

In addition or alternatively, it checks whether the at least one predefinable enabling criterion is a driver's condition criterion from the following group:

A driver of the motor vehicle averts his gaze from the route to be driven for a period of time that is above a predefinable threshold;

A driver of the motor vehicle has his eyes closed for a period of time that is above a predefinable threshold;

A driver of the motor vehicle performs a secondary activity for a period of time that is above a predefinable threshold;

A driver of the motor vehicle meets at least one predefinable fatigue criterion;

A driver of the motor vehicle does not meet at least one predefinable health criterion.

The further progress of the method results from the embodiment of a method according to the present disclosure as shown in FIG. 1.

By means of a method according to the present disclosure for operating a lane-keeping assistance device of a motor vehicle, an increase in customer acceptance of a lane-keeping assistance device can be achieved. Fewer unauthorized warning interventions occur. The utilization rate of the lane-keeping assistance device is significantly increased, which contributes to a considerable increase in traffic safety.

The invention claimed is:

1. A method for operating a lane-keeping assistance device of a motor vehicle, the method comprising:
    initializing the lane-keeping assistance device for activation;
    checking for at least one predefinable enabling criterion for enabling actuation of the lane-keeping assistance device for triggering a steering intervention in response to a trigger signal for actuating the lane-keeping assistance device for triggering the steering intervention being established;
    enabling the actuation of the lane-keeping assistance device for triggering the steering intervention in response to the at least one predefinable enabling criterion being established;
    in response to determining that the at least one predefinable enabling criterion is not fulfilled, checking for a predefinable number of enabling criteria being fulfilled at least to a predefinable percentage; and
    in response to determining that the predefinable number of enabling criteria are being fulfilled at least to the predefinable percentage, enabling the actuation of the lane-keeping assistance device for triggering the steering intervention.

2. The method of claim 1, wherein checking for the at least one predefinable enabling criterion comprises checking a driving situation criterion that is one of:
    a driver of the motor vehicle driving on a route having an average road curvature below a first predefinable threshold value over a predefinable route length or a predefinable period of time,
    the driver driving a route having a length above a second predefinable threshold value,
    the driver driving for a period of time above a third predefinable threshold value,
    the driver travelling on a route having peripheral development above a predefinable monotony threshold value,
    the driver has to complete a route having a length above a fourth predefinable threshold value, or
    the driver driving under a fifth predefinable threshold of ambient visibility conditions.

3. The method of claim 2, wherein the ambient visibility conditions comprise ambient brightness in darkness, ambient brightness at a late hour, ambient brightness in fog, and/or ambient brightness under precipitation.

4. The method of claim 2, wherein checking the driving situation criterion comprises establishing presence of the driving situation criterion using one or more devices, the one or more devices being:
   a navigation system,
   a transverse acceleration sensor,
   a steering angle sensor,
   a front camera,
   a clock, or
   a light sensor.

5. The method of claim 1, wherein checking for the at least one predefinable enabling criterion comprises checking a condition criterion of a driver of the motor vehicle that is one of:
   the driver averting gaze from a route to be driven for a period of time above a first predefinable threshold,
   the driver having eyes closed for a period of time above a second predefinable threshold,
   the driver performing a secondary activity for a period of time above a third predefinable threshold,
   the driver meeting at least one fatigue criterion, or
   the driver not meeting at least one predefinable health criterion.

6. The method of claim 5, wherein checking the condition criterion comprises checking the condition criterion using one or more devices, the one or more devices being:
   a driver observation camera,
   a human-machine interface of the motor vehicle,
   a mobile terminal coupled to the motor vehicle,
   an interior microphone,
   a vehicle steering,
   a pulse measuring device, or
   a body temperature measuring device.

7. The method of claim 1, further comprising:
   in response to determining that the predefinable number of enabling criteria are not fulfilled at least to the predefinable percentage, outputting a warning signal at or a predefinable time before crossing a lane marking line.

8. The method of claim 7, wherein the warning signal is a visual warning instruction or a haptic instruction.

9. The method of claim 1, wherein initializing the lane-keeping assistance device for activation comprises actuating the lane-keeping assistance device to trigger the steering intervention upon establishment of the trigger signal.

10. The method of claim 9, further comprising:
    checking whether at least one predefinable blocking criterion for blocking the actuation of the lane-keeping assistance device is being fulfilled; and
    blocking the actuation of the lane-keeping assistance device in response to the at least one predefinable blocking criterion for blocking the actuation of the lane-keeping assistance device being fulfilled.

11. The method of claim 10, wherein the at least one predefinable blocking criterion is one of:
    a driver of the motor vehicle sets a turn indicator on a side on which the driver intends to cross a lane marking line,
    the driver steers towards an inside of a curve, or
    the driver drives up to a slower driving front vehicle and starts passing without using the turn indicator.

12. The method of claim 1, further comprising combining the enabling criteria using a neural network or a fuzzy logic based algorithm.

13. The method of claim 1, further comprising generating the trigger signal for actuating the lane-keeping assistance device, in response to detecting by a front camera of the motor vehicle that the motor vehicle is about to cross a lane marking line.

14. The method of claim 4, further comprising coupling a control device to the one or more devices for checking the driving situation criterion.

15. The method of claim 6, further comprising coupling a control device to the one or more devices for checking the condition criterion.

16. A system for operating a motor vehicle, the system comprising:
    a lane-keeping assistance device; and
    a control device coupled to the lane-keeping assistance device, the control device configured to:
       check a trigger signal for actuating the lane-keeping assistance device for triggering a steering intervention,
       check for at least one predefinable enabling criterion for enabling actuation of the lane-keeping assistance device for triggering the steering intervention in response to the trigger signal, and
       enable the actuation of the lane-keeping assistance device for triggering the steering intervention in response to the at least one predefinable enabling criterion being established;
       check for a predefinable number of enabling criteria being fulfilled at least to a predefinable percentage, in response to determining that the at least one predefinable enabling criterion is not fulfilled, and
       enable the actuation of the lane-keeping assistance device for triggering the steering intervention, in response to determining that the predefinable number of enabling criteria are being fulfilled at least to the predefinable percentage.

* * * * *